(12) United States Patent
Buttrick, Jr.

(10) Patent No.: US 6,550,129 B1
(45) Date of Patent: Apr. 22, 2003

(54) PORTABLE COMPUTER NUMERIC CONTROLLED MANUFACTURING MACHINES AND ASSOCIATED METHODS

(75) Inventor: James N. Buttrick, Jr., Seattle, WA (US)

(73) Assignee: The Boeing Company, Seattle, WA (US)

( * ) Notice: Subject to any disclaimer, the term of this patent is extended or adjusted under 35 U.S.C. 154(b) by 15 days.

(21) Appl. No.: 09/668,914

(22) Filed: Sep. 25, 2000

(51) Int. Cl.[7] ................................................ B23P 13/04
(52) U.S. Cl. ........................ 29/558; 29/897.2; 408/1 R; 408/3; 408/42; 408/99
(58) Field of Search ............................... 29/897.2, 897, 29/558, 557, 701, 709, 714, 407.01, 407.09, 407.1; 408/1 R, 3, 99, 100, 110, 111, 53, 42

(56) References Cited

U.S. PATENT DOCUMENTS

| | | |
|---|---|---|
| 3,650,178 A | 3/1972 | Appleton |
| 3,730,634 A | 5/1973 | Gerber et al. |
| 3,823,644 A | 7/1974 | Mello |
| 4,761,876 A | 8/1988 | Kosmowski |
| 4,864,702 A | 9/1989 | Speller, Sr. et al. |
| 4,951,849 A | 8/1990 | Townsend et al. |
| 5,154,643 A | 10/1992 | Catania et al. |
| 5,297,907 A | 3/1994 | Strait et al. |
| 5,312,211 A * | 5/1994 | Rodriguez |
| 5,384,950 A * | 1/1995 | Kallenberger |
| 5,401,128 A * | 3/1995 | Lindem et al. |
| 5,477,597 A | 12/1995 | Catania et al. |
| 5,538,372 A | 7/1996 | Cuneo et al. |
| 5,694,690 A * | 12/1997 | Micale |
| 6,170,157 B1 * | 1/2001 | Munk et al. |
| 6,254,317 B1 * | 7/2001 | Chang |
| 6,419,426 B1 * | 7/2002 | Chalupa et al. |

* cited by examiner

Primary Examiner—Gregory M. Vidovich
Assistant Examiner—T. Nguyen
(74) Attorney, Agent, or Firm—Alston & Bird LLP

(57) ABSTRACT

A workpiece is assembled by removably mounting an alignment tool to a conventional wing structure so that the alignment tool holds multiple conventional strut fittings to the wing structure. A frame of a CNC manufacturing machine is moved to and removably mounted to the workpiece. The orientation of the workpiece with respect to the frame mounted thereto is quantified. A predetermined pattern of operations to be performed by the CNC manufacturing machine to form attachment holes for use in attaching the strut fittings to the wing structure is adjusted to compensate for the orientation of the workpiece relative to the frame. Thereafter, the CNC manufacturing machine automatically forms the attachment holes.

13 Claims, 15 Drawing Sheets

PORTABLE COMPUTER NUMERIC CONTROLLED MANUFACTURING MACHINES AND ASSOCIATED METHODS

FIELD OF THE INVENTION

The present invention pertains to computer numeric controlled ("CNC") manufacturing machines and, more particularly, to portable CNC manufacturing machines.

BACKGROUND OF THE INVENTION

One type of traditional CNC manufacturing machine has a bed with a base that is immovably mounted to the floor and a holding system that is immovably mounted to the base for releasably holding a workpiece. The traditional CNC manufacturing machine further includes a primary carriage that is movably carried by the bed and a secondary carriage that is movably carried by the primary carriage. The primary carriage is capable of being reciprocated relative to the bed along a primary path, and the secondary carriage is capable of being reciprocated relative to the primary carriage along a secondary path that is orthogonal to the primary path. The secondary carriage has a motor-driven spindle that includes an integral clamp for holding tools. The spindle can pivot relative to the secondary carriage, and the spindle can also reciprocate relative to the secondary carriage along a spindle path that can be orthogonal to the primary and secondary paths.

Such a traditional CNC manufacturing machine is ideal for situations in which a workpiece can be easily introduced to the holding system of the machine. However, it can be difficult or impossible to optimally introduce some types of workpieces to the holding system of the traditional CNC manufacturing machine, such as workpieces to which access is restricted and large workpieces. An example of a workpiece that can in some situations be difficult to introduce to the holding systems of some types of traditional CNC manufacturing machines is an aircraft wing or, more specifically, a wing that is connected to a fuselage.

Even though there may be a conventional CNC manufacturing machine that could be used to manufacture attachment holes through which bolts are received for attaching strut fittings to aircraft wings, it is conventional for CNC manufacturing machines not to be used in this process, which indicates that it is not cost-effective to use conventional CNC manufacturing machines for this process. In the current process, the attachment holes are "matched drilled" on the wing in a vertical orientation, in wing majors. Spacing of the strut fittings relative to each other and relative to the wing is critical, so the fittings are accurately located on the wing using an alignment tool. The positions of the attachment holes in the strut fittings and overlying wing structure are established by using drill plates that are affixed to the alignment tool.

The drill plates are designed to retain power-feed drill motors (e.g., power-feed brand power-feed drill motors) that operate to spot face, drill and ream the strut fittings and overlying wing structure. A separate power-feed drill motor is setup for each tool. For example, if an attachment hole needs to be spot faced, drilled and reamed, then three separate power-feed drill motors are used. This results in a large inventory of power-feed drill motors and a considerable planning and support effort to have all of the equipment available to install the strut fittings. Power-feed drill motors are heavy, and it is physically difficult to manually position them on the alignment tools. Drilling an attachment hole in both titanium (strut fitting material) and aluminum (wing material) with a power-feed drill motor is a slow process. Titanium must be drilled at slow speeds (approximately 100–500 rpm), while aluminum can be drilled at higher speeds (approximately 1000–6000 rpm). With the current equipment, titanium paces the drilling operation and some holes take up to 18 minutes to drill. Additionally, hole patterns must often be shifted to adjust for "edge margin." The drill plates make this difficult to accomplish. Additionally, access to the strut fittings for shimming and coldworking is difficult with the drill plates in position.

Accordingly, there is a need for improved CNC manufacturing machines and associated methods that can be efficiently used with workpieces to which access is restricted and large workpieces, and in particular that can be efficiently used for forming attachment holes for use in attaching strut fittings to wing structures.

SUMMARY OF THE INVENTION

The present invention solves the above and other problems by providing portable CNC manufacturing machines and associated methods that can, in accordance with one aspect of the present invention, be utilized to efficiently manufacture attachment holes for use in attaching strut fittings to wing structures, and that can also be utilized in the manufacture of other items.

In accordance with one aspect of the present invention, a method of manufacturing attachment holes initially includes assembling a workpiece. The workpiece is assembled by removably mounting an alignment tool to a wing structure so that the alignment tool holds a plurality of strut fittings to the wing structure. Preferably, the wing structure and strut fittings are conventional, and the alignment tool is at least partially conventional. The method further includes moving a subassembly of a CNC manufacturing machine to the workpiece and removably mounting the subassembly to the workpiece. Thereafter, the orientation of the workpiece with respect to the subassembly of the CNC manufacturing machine is quantified. A predetermined pattern of operations to be performed by the manufacturing machine to form the attachment holes is adjusted to compensate for the orientation of the workpiece relative to the subassembly. Thereafter, the CNC manufacturing machine forms the attachment holes.

In accordance with one aspect of the present invention, the alignment tool is conventional, except that it includes one or more fastener portions and one or more artifact structures. The fastener portions are utilized in the mounting of the subassembly of the CNC manufacturing machine to the workpiece. The artifact structures are utilized in the quantifying of the orientation of the workpiece with respect to the subassembly of the CNC manufacturing machine.

In accordance with one aspect of the present invention, multiple attachment holes are formed through a respective strut fitting and the overlying portion of the wing structure. A spindle of the CNC manufacturing machine is rotated at a first speed while drilling through the strut fitting and at a second speed, that is substantially greater than the first speed, while drilling through the overlying wing structure, with the drilling through the wing structure following immediately after the drilling through the strut fitting. Varying the speed of the drilling advantageously optimizes the drilling by compensating for the strut fittings being harder to drill into than the wing structure.

In accordance with one aspect of the present invention, the subassembly of the CNC manufacturing machine includes a frame, a positioning system for moving the frame to the workpiece, a mounting system for mounting the frame to the workpiece, at least one gantry carried by the frame for back and forth movement along the frame, and a carriage mounted to the gantry for back and forth movement along the gantry. The spindle is carried by, and moveable with respect to, the carriage. The spindle includes a removable integral tool holder for releasably holding the tools utilized by the CNC manufacturing machine to manufacture the attachment holes.

In accordance with one aspect of the present invention, the positioning system advantageously operates such that the subassembly of the CNC manufacturing machine can be conveniently moved into place with respect to a workpiece to be worked upon. Thereafter, the manufacturing machine can advantageously automatically orient itself with respect to the workpiece and form the attachment holes.

In accordance with one aspect of the present invention, the subassembly of the CNC manufacturing machine can advantageously be relatively light-weight because it is mounted to the workpiece in a manner that increases the rigidity of the manufacturing machine, so as to provide sufficient rigidity for accurately performing the desired manufacturing operations.

BRIEF DESCRIPTION OF THE DRAWINGS

FIG. 9 illustrates attachment holes that extend through the strutting fitting and into the wing structure, in accordance with the first embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

In accordance with one aspect of the present invention, a portable CNC manufacturing machine is provided that can be efficiently utilized to manufacture attachment holes for use in attaching strut fittings to a wing structure. In accordance with one aspect of the present invention, appropriate portions of the CNC manufacturing machine can be conveniently moved into place with respect to a workpiece to be machined, and the manufacturing machine can automatically orient itself with respect to the workpiece and perform manufacturing operations. In accordance with one aspect of the present invention, appropriate portions of the CNC manufacturing machine can be made relatively light-weight if desired, because the CNC manufacturing machine is preferably mounted to the workpiece in a manner that increases the rigidity of the manufacturing machine.

Figure 1:
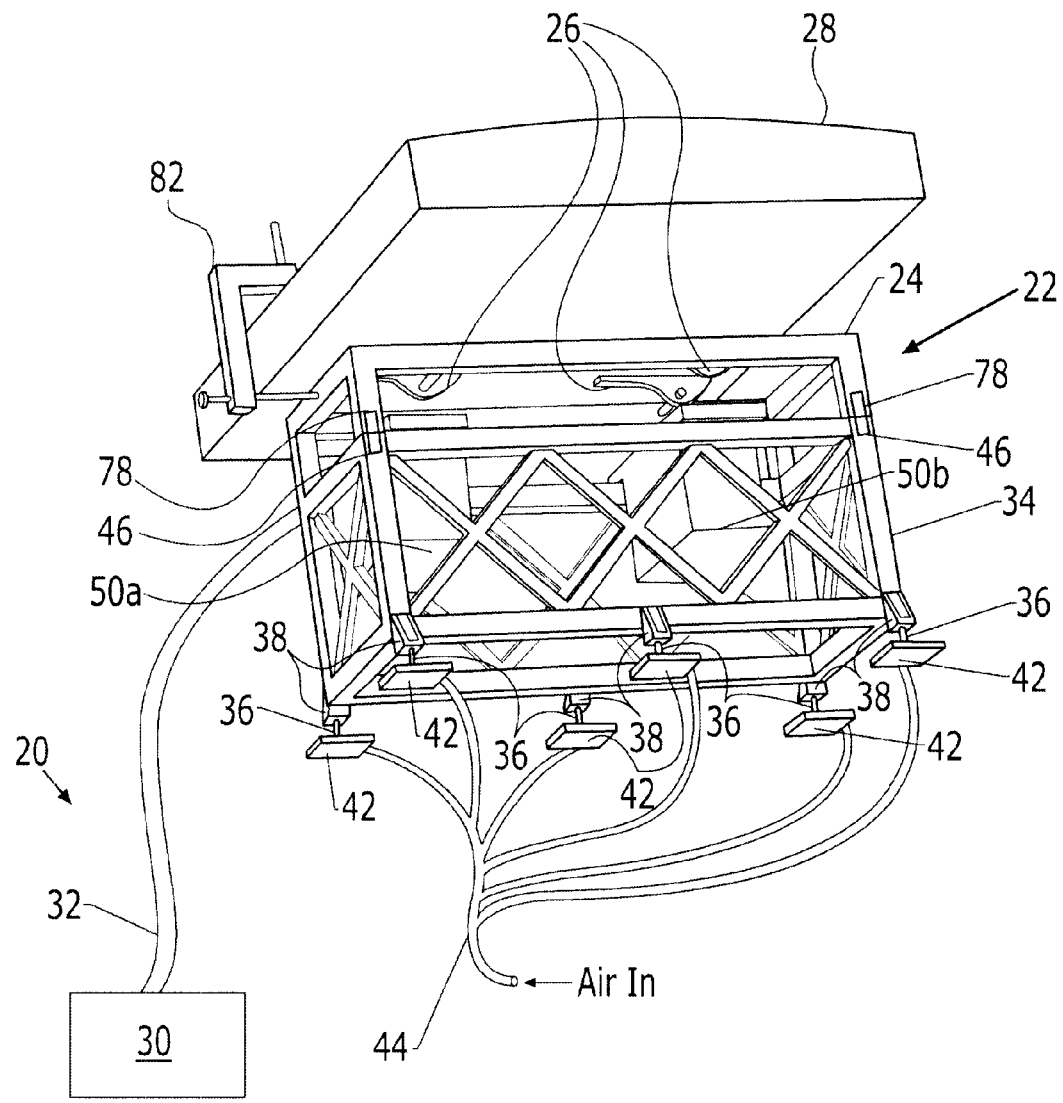
FIG. 1 is a schematic, environmental, partially pictorial view of a portable CNC manufacturing machine, in accordance with a first embodiment of the present invention.

FIG. 1 illustrates a portable CNC manufacturing machine 20 mounted to a workpiece 22, in accordance with a first embodiment of the present invention. In accordance with the first embodiment, the workpiece includes an alignment tool 24 that is carrying conventional strut fittings 26 and is mounted to a conventional wing structure 28. However, the manufacturing machine 20 can be used to machine a variety of different types of workpieces and the scope of the present invention is not limited to the particular workpieces described herein. As one example and in accordance with an alternative embodiment of the present invention, the alignment tool 24 can be characterized as part of the manufacturing machine 20, as opposed to being a part of the workpiece 22.

In accordance with the first embodiment, the manufacturing machine 20 includes a computerized control system 30 that is connected to a subassembly of the manufacturing machine by one or more communication cables 32, so that the control system can control the operation of the subassembly. In accordance with the first embodiment, the subassembly includes a frame 34 and components that are carried by, or carry, the frame. However, the present invention is not limited to the particular frame 34 that is illustrated or the particular components associated with the frame.

In accordance with the first embodiment, the frame 34 is advantageously readily movable between different workpieces and mountable to different workpieces. In accordance with the first embodiment, the movability of the frame 34 between workpieces is facilitated through the use of a positioning system that is mounted to the lower portion of the frame. In accordance with the first embodiment, the positioning system includes multiple screw jacks 36. Each screw jack 36 has a threaded shaft that is threadedly received by a respective flange 38 that protrudes from the lower portion of the frame 34. The screw jacks 36 can be manually or automatically operated to adjust the elevation of the frame 34 with respect to the floor (for example see the floor 40 illustrated in FIGS. 15–17) that supports the frame. In accordance with the first embodiment, the positioning system further includes multiple transport devices that are preferably air bearings 42, with each air bearing serving as the base of a respective screw jack 36. Air under pressure is selectively provided to the air bearings 42 via a tubular air supply system 44. A cushion of air is formed between the air bearings 42 and the floor so that the frame 34 can be readily manually moved across the floor while air is supplied to the air bearings. A variety of other types of positioning systems, such as cranes, are within the scope of the present invention.

Figure 2:
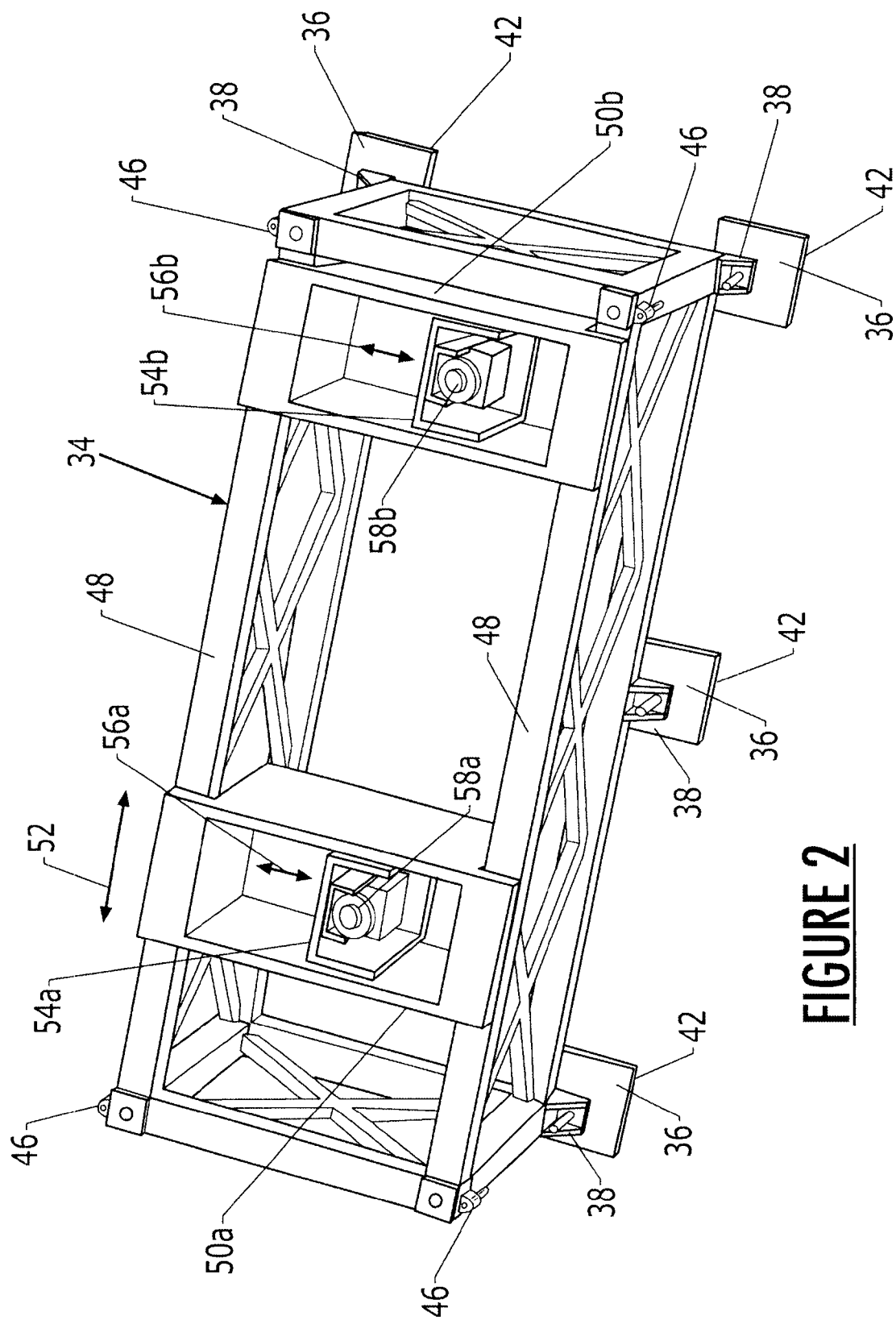
FIG. 2 is a schematic, isolated, top pictorial view of a subassembly of the manufacturing machine of FIG. 1.

Referring to FIG. 2, in accordance with the first embodiment, the manufacturing machine 20 (FIG. 1) further includes a mounting system for removably mounting the frame 34 to the workpiece 22 (FIG. 1). In accordance with the first embodiment, the mounting system includes multiple lower fastener portions 46 mounted to the periphery of the upper portion of the frame 34, namely at the four upper corners of the frame. In accordance with the first embodiment, the lower fastener portions 46 are lower portions of latches or any other type of hard tooling for facilitating locking and restriction of movement in three spatial dimensions, or the like. A variety of different types of fasteners for facilitating the mounting of the frame 32 to the workpiece 22 are within the scope of the present invention, as will be discussed in greater detail below.

In accordance with the first embodiment, the upper portion of the frame 34 further includes longitudinally extending rails 48 that are laterally displaced from one another. In accordance with the first embodiment, the frame 34 carries separate carriages that are preferably, but not necessarily, in the form of gantries 50a, 50b. The gantries 50a, 50b are carried by the rails 48 for back and forth movement in the longitudinal direction that is indicated by arrow 52. In accordance with other embodiments, only a single gantry or more than two gantries are carried by the rails 48. The gantry 50a carries a carriage 54a that is movable back and forth in the lateral direction along the gantry 50a, and the lateral direction is indicated by arrow 56a. Similarly, the gantry 50b carries a carriage 54b that is movable back and forth in the lateral direction along the gantry 50b, and the lateral direction is indicated by arrow 56b.

The carriages 54a, 54b respectively includes spindles 58a, 58b. As will be discussed in greater detail below and in accordance with the first embodiment, the spindles 58a, 58b are respectively movable along their axes and pivotable relative to their carriages 54a, 54b. Preferably each of the spindles 58a, 58b has associated therewith a nozzle (not shown), which can be either internal or external to the spindle, for directing coolant to the respective area of the workpiece that is being machined and/or the spindles allow for through-spindle coolant delivery. In accordance with the first embodiment, the spindles 58a, 58b are identical. Accordingly, the following discussion of the spindle 58a is representative of the spindle 58b.

Figure 3:
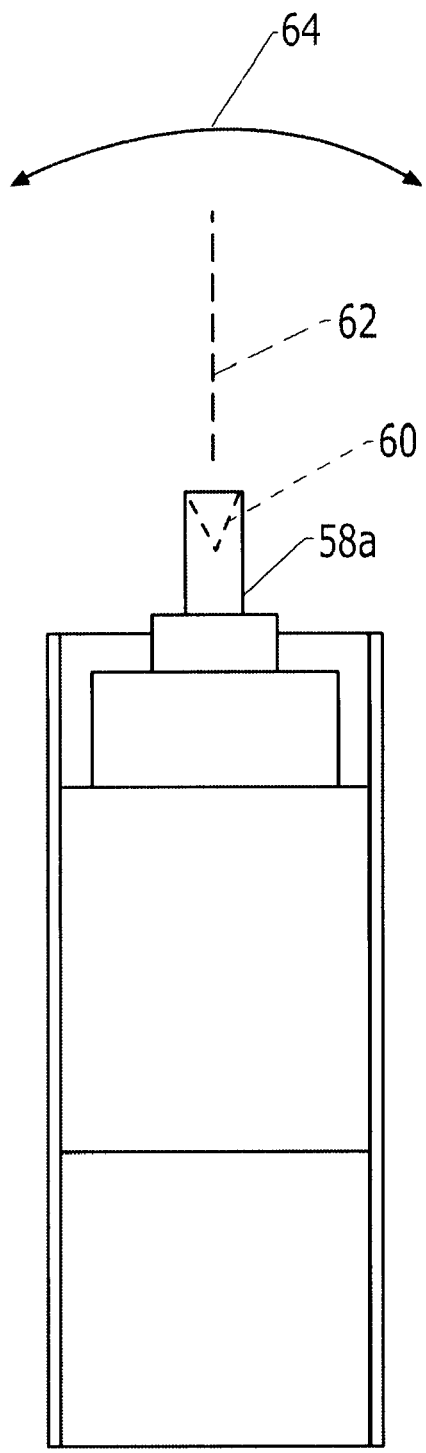
FIG. 3 is a schematic, isolated, elevation view of a spindle assembly of the manufacturing machine of FIG. 1.

Referring to FIG. 3, the spindle 58a includes an integral clamp 60 for gripping and releasing tools. The spindle 58a is capable performing spot facing, drilling and reaming functions while the clamp 60 grips the appropriate tool. That is and in accordance with the first embodiment, the spindle 58 is movable back and forth coaxially along the spindle axis 62, which can be orthogonal to the travel paths of the gantry 50a (FIG. 2) and the carriage 54a (FIG. 2). In addition, the spindle 58a is capable of pivoting back and forth relative to the carriage 54a, and the pivoting direction is indicated by arrow 64. This pivoting can be utilized to account for the curvature of the bottom surface of the wing structure 28 (FIG. 1).

Figures 13, 14:
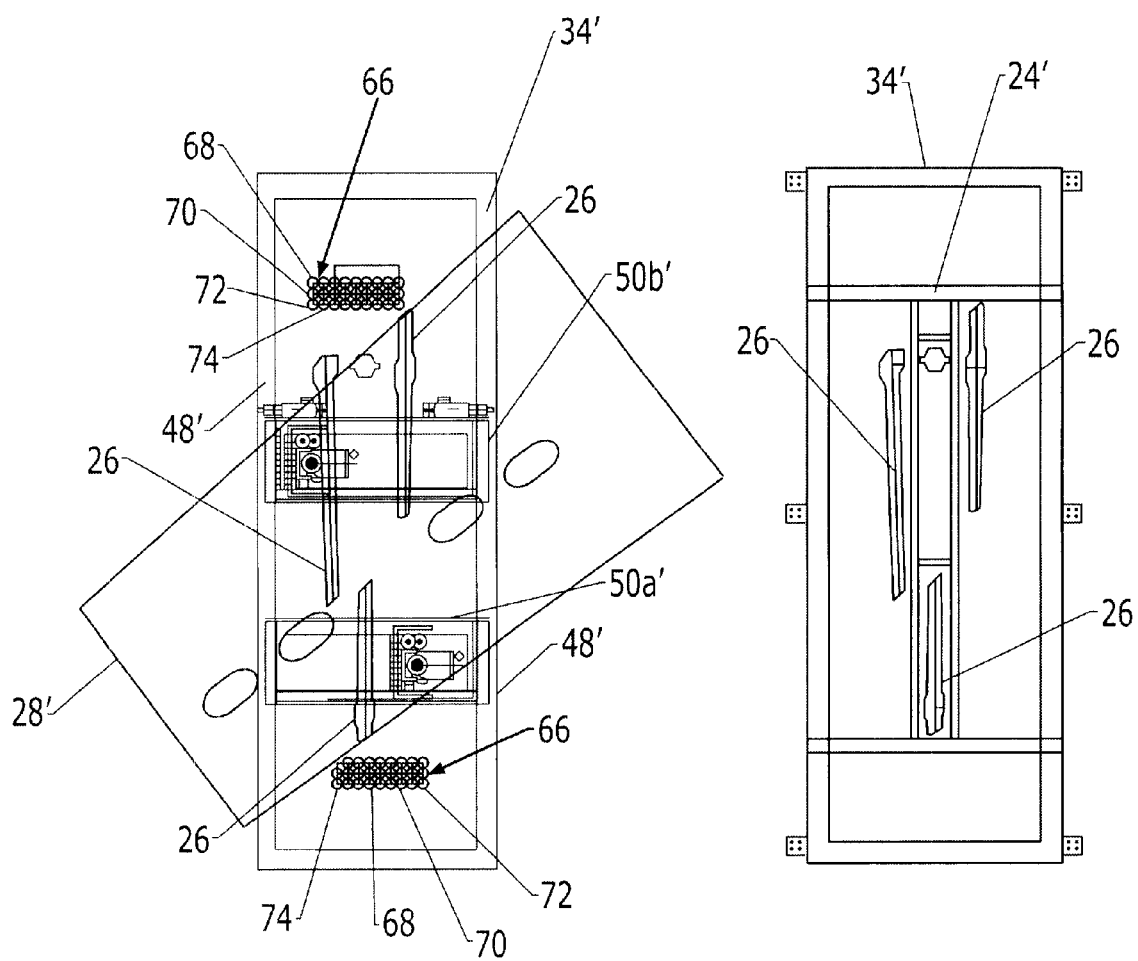
FIG. 13 is a partial, schematic, environmental, top plan view of a portable manufacturing machine, in accordance with a third embodiment of the present invention.
FIG. 14 is a partial, schematic, environmental, top plan view of the manufacturing machine of FIG. 13, in accordance with the third embodiment of the present invention.

In accordance with the first embodiment and as will be discussed in greater detail below, the clamp 60 automatically manipulates tools, namely a touch probe, spot facer, drill bit, and reamer, that are contained in a tool holder station while not in use. The tool holder station is mounted to an upper portion of the frame 34 (FIGS. 1–2). FIG. 13 schematically illustrates representative tool holder stations 66 and tools held by the tool holder stations, namely touch probes 68, spot facers 70, drill bits 72, and reamers 74, in accordance with a third embodiment of the present invention that is identical to the first embodiment, except for variations noted herein and variations that will be apparent to those of ordinary skill in the art. The touch probe, spot facer, drill bit, and reamer are conventional and should be understood by those of ordinary skill in the art.

Figure 7:
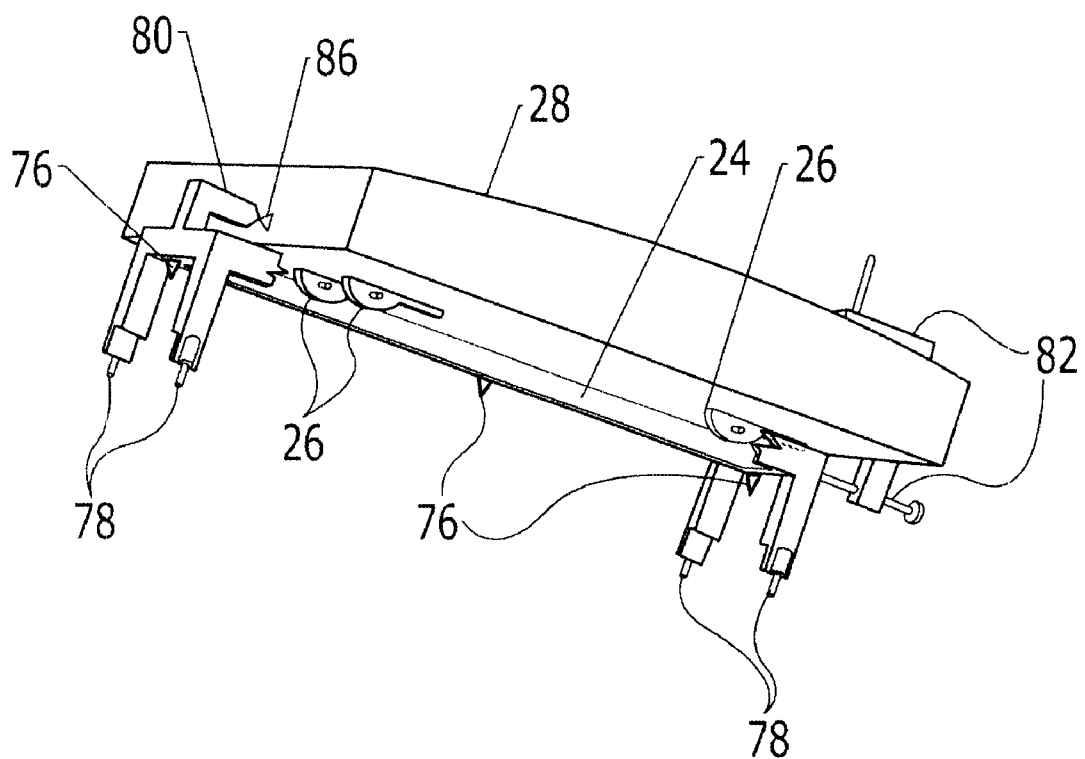
FIG. 7 is a schematic, partially cut-away, pictorial view of the environmental features of FIG. 1, which include the alignment tool and strut fittings mounted to a conventional wing structure, in accordance with the first embodiment of the present invention.

Regarding the touch probe more specifically, it is a sensing device that is used, in accordance with the first embodiment, for sensing multiple artifact structures 76 (which are schematically illustrated in FIG. 7) of the alignment tool 24, as will be discussed in greater detail below. A variety of different types of artifact structures are within the scope of the present invention. Whereas a variety of different types of touch probes are within the scope of the present invention, in accordance with the first embodiment, the touch probe is conventional; therefore, it is only schematically illustrated in FIG. 13. In accordance with the first embodiment, an acceptable example of the touch probe is an optical probe for machining centers, and more specifically such probes are available from Renishaw, Inc., of Schaumburg, Ill.

Figure 4:
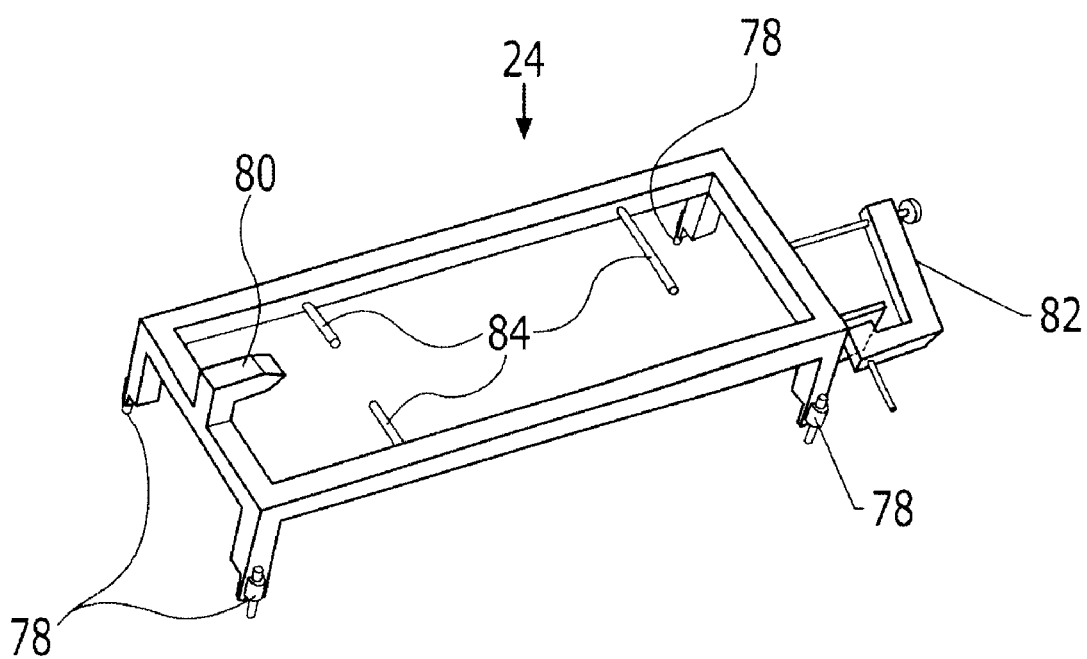
FIG. 4 is a schematic, isolated, top pictorial view of an alignment tool that is one of the environmental features illustrated in FIG. 1, in accordance with the first embodiment of the present invention.

Referring to FIG. 4, in accordance with the first embodiment, the alignment tool 24 is conventional except that it includes the multiple artifact structures 76 (FIG. 7) and a mounting system for mounting the alignment tool to the frame 34 (FIGS. 1–2) of the portable CNC manufacturing machine 20 (FIG. 1). In accordance with the first embodiment, each of the artifact structures 76 is mounted to the alignment tool 24 and the artifact structures are the targets of the touch probe during operations of quantifying the orientation of the workpiece 22 (FIGS. 1 and 7), as will be discussed in greater detail below. In accordance with the first embodiment, the mounting system of the alignment tool 24 includes multiple upper fastener portions 78 that are mounted to the periphery of the lower portion of the alignment tool, namely at the four lower corners of the alignment tool. In accordance with the first embodiment, the upper fastener portions 78 are upper portions of latches, or the like. A variety of different types of fasteners for facilitating the mounting of the frame 32 (FIGS. 1–2) to the workpiece 22 are within the scope of the present invention, as will be discussed in greater detail below.

The alignment tool 24 further includes a conventional alignment connector 80 and a conventional swing clamp 82 that are utilized to mount the alignment tool to the wing structure 28 (FIGS. 1 and 8–9) in a conventional manner, as will be discussed in greater detail below. The alignment tool 24 also includes rods 84 that respectively extend through the bores of the strut fittings 26 (FIGS. 1 and 6–8) in a conventional manner so that the strut fittings are appropriately positioned against the underside of the wing structure 28 while the alignment tool is properly mounted to the wing structure, as will be discussed in greater detail below. The alignment tool 24 can function in a conventional manner to properly position the strut fittings 26 on the wing structure 28 so that after the strut fittings are secured to the wing structure the appropriate engine strut (not shown) can be optimally mounted to the strut fittings.

Figure 5:
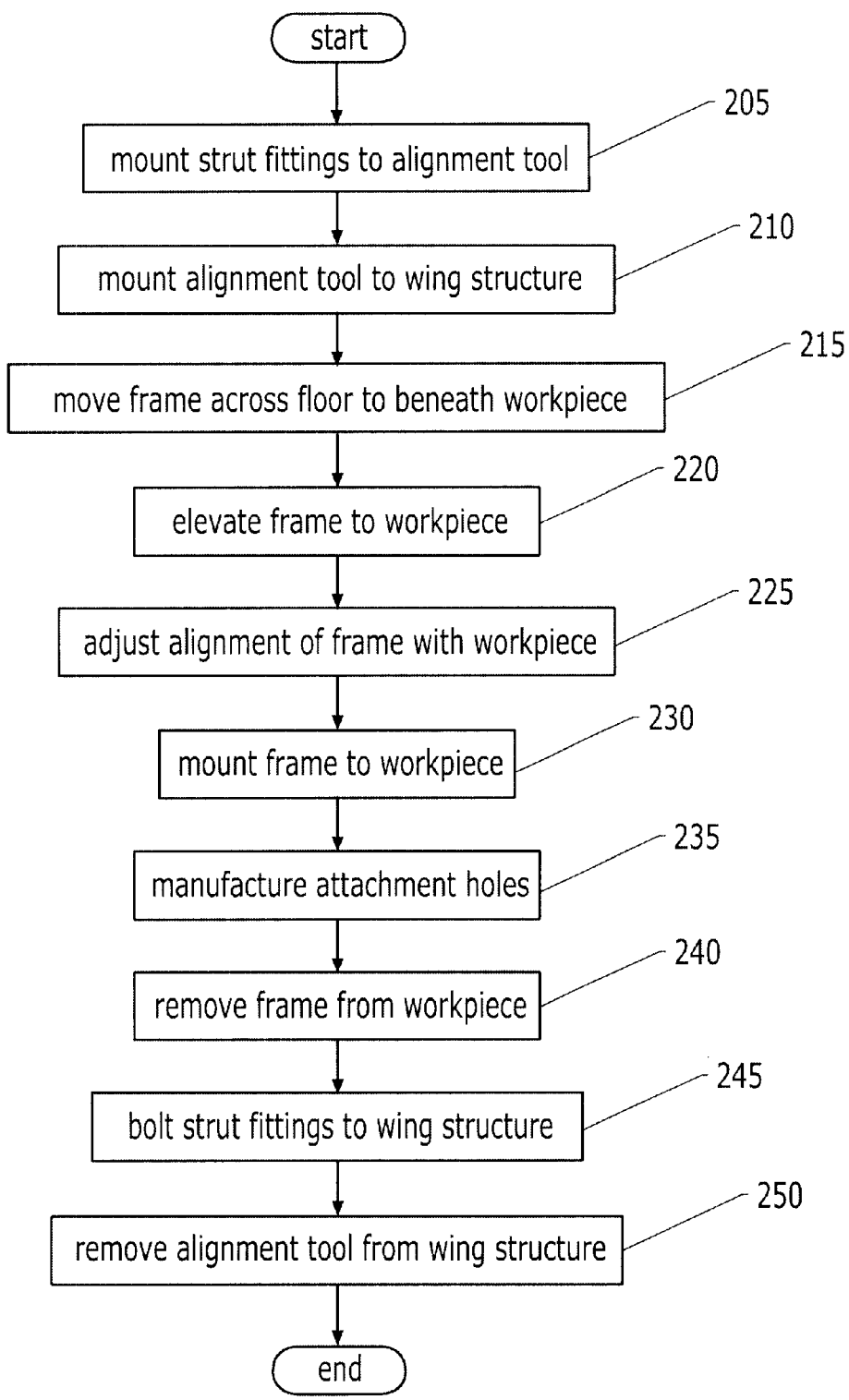
FIG. 5 presents a flow chart illustrating high level operations associated with mounting strut fittings to a wing structure through the use of the manufacturing machine of FIG. 1, in accordance with the first embodiment of the present invention.

FIG. 5 presents a flow chart illustrating high level operations associated with mounting the strut fittings 26 to the wing structure 28, in accordance with the first embodiment of the present invention. In accordance with the first embodiment, the wing structure 28 remains generally stationary, supported and horizontally oriented throughout the operations described herein; however, the present invention is not limited to these wing arrangements or even wings for that matter. For example and in accordance with an alternative embodiment of the present invention, a portable CNC manufacturing machine is used in the mounting of strut fittings 26 to a vertically oriented wing structure. In this alternative embodiment, the portable CNC manufacturing machine is like the portable CNC manufacturing machine 20 (FIG. 1) of the first embodiment, except that its positioning system preferably includes a crane, or the like, rather than or in addition to the air bearings 42 and/or screw jacks 36.

In accordance with the first embodiment, the operations of the gantry 50a are representative of the operations of the gantry 50b, and the gantries 50a, 50b and the components carried thereby are operated simultaneously on separate and respective ones of the strut fittings 26 that are to be mounted to the same wing structure 28. The operations illustrated by FIG. 5 will now be described with reference to the gantry 50a, in accordance with the first embodiment.

Figure 6:
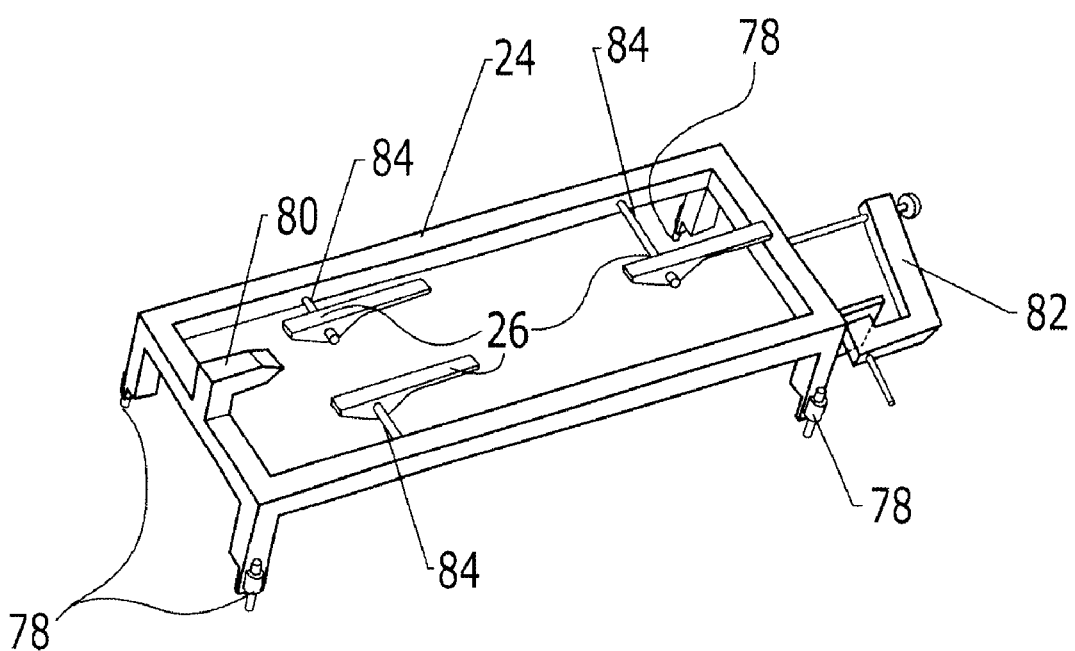
FIG. 6 is a schematic, top pictorial view of the alignment tool of FIG. 4 carrying conventional strut fittings, which are additional ones of the environmental features illustrated in FIG. 1, in accordance with the first embodiment of the present invention.

Referring to FIG. 5, the strut fittings 26 are mounted to the alignment tool 24 in a conventional manner at step 205 to provide the configuration schematically illustrated in FIG. 6, as should be understood by those of ordinary skill in the art. At step 210, the alignment tool 24, with the strut fittings 26 mounted thereto, is mounted to a supported and horizontally oriented wing structure 28 to provide the configuration schematically illustrated in FIG. 7. A portion of the alignment tool 24 is cut away in FIG. 7 so that the strut fittings 26 are seen engaging the underside of the wing structure 28. Regarding step 210 more specifically, the alignment connector 80 of the alignment tool 24 is mounted to the pitch load fitting 86 (also see FIG. 8) of the wing structure 28 and the swing clamp 82 is clamped to the opposite side of the wing structure so that the strut fittings 26 are properly positioned against the underside of the wing structure 28 in a conventional manner.

At step 215, the frame 34 of the manufacturing machine 20 is moved across the floor (for example see the floor 40 in FIGS. 15–17) to beneath the workpiece 22. In accordance with the first embodiment, movement of the frame 34 is facilitated by supplying air to the air bearings 42 via the tubular air supply system 44, so that the frame can be readily manually moved across the floor on a cushion of air. At step 220, the frame 34 is elevated so that the upper portion of the frame comes into contact with the lower portion of the alignment tool 24. In accordance with the first embodiment, the frame 34 is elevated by operating the screw jacks 36.

At step 225, the alignment of the frame 34 with the workpiece 22 is manually iteratively adjusted until the upper and lower fastener portions 78, 46 are respectively aligned with one another so that the frame can be mounted to the workpiece by respectively securing the lower fastener portions to the upper fastener portions, or visa versa. The iterative adjustments at step 225 include using the screwjacks 36 and air bearings 42 to appropriately adjust the position of the frame 34. In accordance with the first embodiment, the combination of an upper fastener portion 78 and its respective lower fastener portion 46 is a conventional latch or another type of hard tooling for facilitating locking and restriction of movement in three spatial dimensions; however, in accordance with alternative embodiments of the present invention the latches can be replaced with other conventional fastening and connecting devices such as, but not limited to, clamps, or the like.

In accordance with the first embodiment, the frame 34 is dedicated to the alignment tool 24, which means that the frame can be adequately manually aligned with the alignment tool at step 225 by moving the frame to a position in which the upper and lower fastener portions 78, 46 are respectively aligned with one another so that the frame can be mounted to the workpiece 22 by respectively securing the fastener portions to one another. However, in accordance with a second embodiment of the present invention that will be discussed in greater detail below with reference to FIG. 12, the frame (for example see the frame 34) is not specifically dedicated to any single alignment tool (for example see the alignment tool 24), and the manufacturing machine (for example see the manufacturing machine 20) performs operations to aid in the alignment of the frame to the alignment tools.

At step 230 of FIG. 5, the upper and lower fastener portions 78, 46 are respectively mated (e.g., latched) to one another so that the frame 34 is mounted to the workpiece 22 in the manner that is illustrated in FIG. 1. In accordance with the first embodiment, the frame 34 is relatively light-weight, and the mounting of the frame to the workpiece 22 in the illustrated manner increases the rigidity of the manufacturing machine to a level that is sufficient for the manufacturing machine to be capable of sufficiently accurately performing its manufacturing operations, which are discussed in greater detail below. In addition or as a result, the wing structure 28 bears at least some of the weight of the frame 34. That is, the wing structure 28 adds to the rigidity of the system that includes the frame 34 of the manufacturing machine 20 mounted to the workpiece 22. In accordance with an alternative embodiment of the present invention, the frame 34 of the manufacturing machine 20 is manufactured to be sufficiently rigid without relying upon the rigidity of the workpiece 22.

Figure 10:
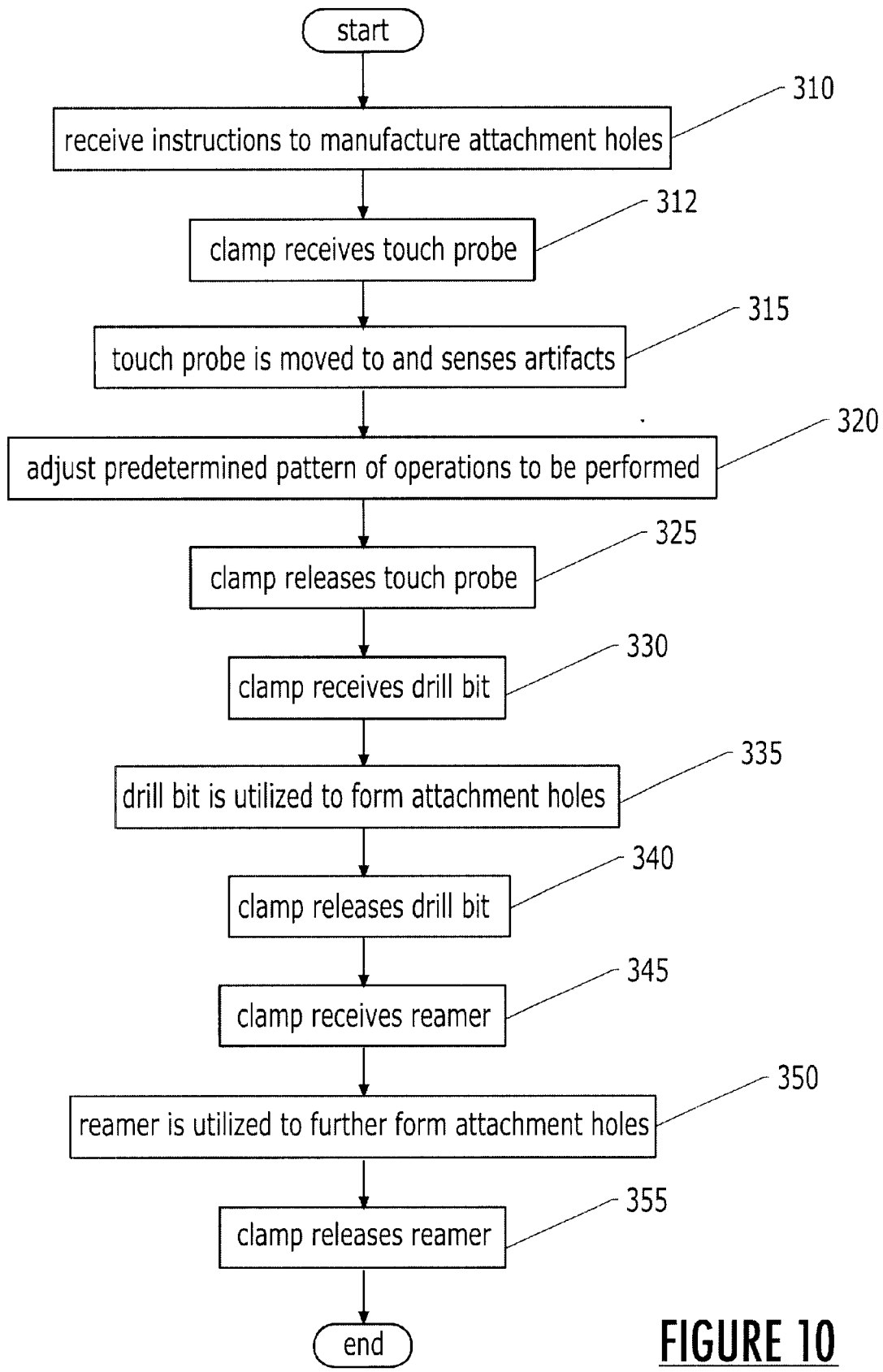
FIG. 10 presents a flow chart illustrating operations performed by the manufacturing machine of FIG. 1 in the furtherance of forming the attachment holes, in accordance with the first embodiment of the present invention.
Figure 11:
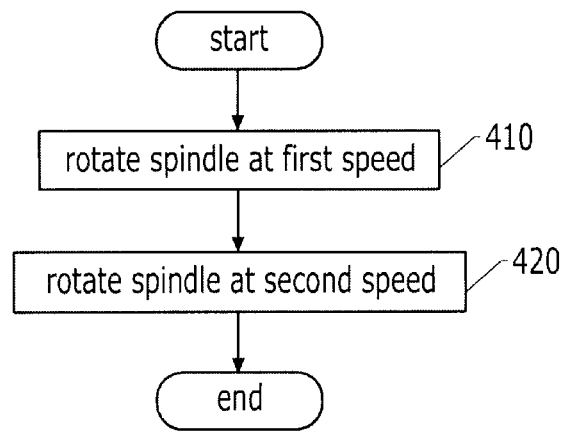
FIG. 11 presents a flow chart illustrating drilling operations performed by the manufacturing machine of FIG. 1 while forming one of the attachment holes, in accordance with the first embodiment of the present invention.

At step 235, attachment holes 88 (FIG. 9) for use in attaching the strut fittings 26 to the wing structure 28 are sequentially manufactured by the manufacturing machine 20. FIGS. 10–11, which will be discussed in greater detail below, present flow charts illustrating operations performed by the manufacturing machine 20 to form the attachment holes 88.

Figure 8:
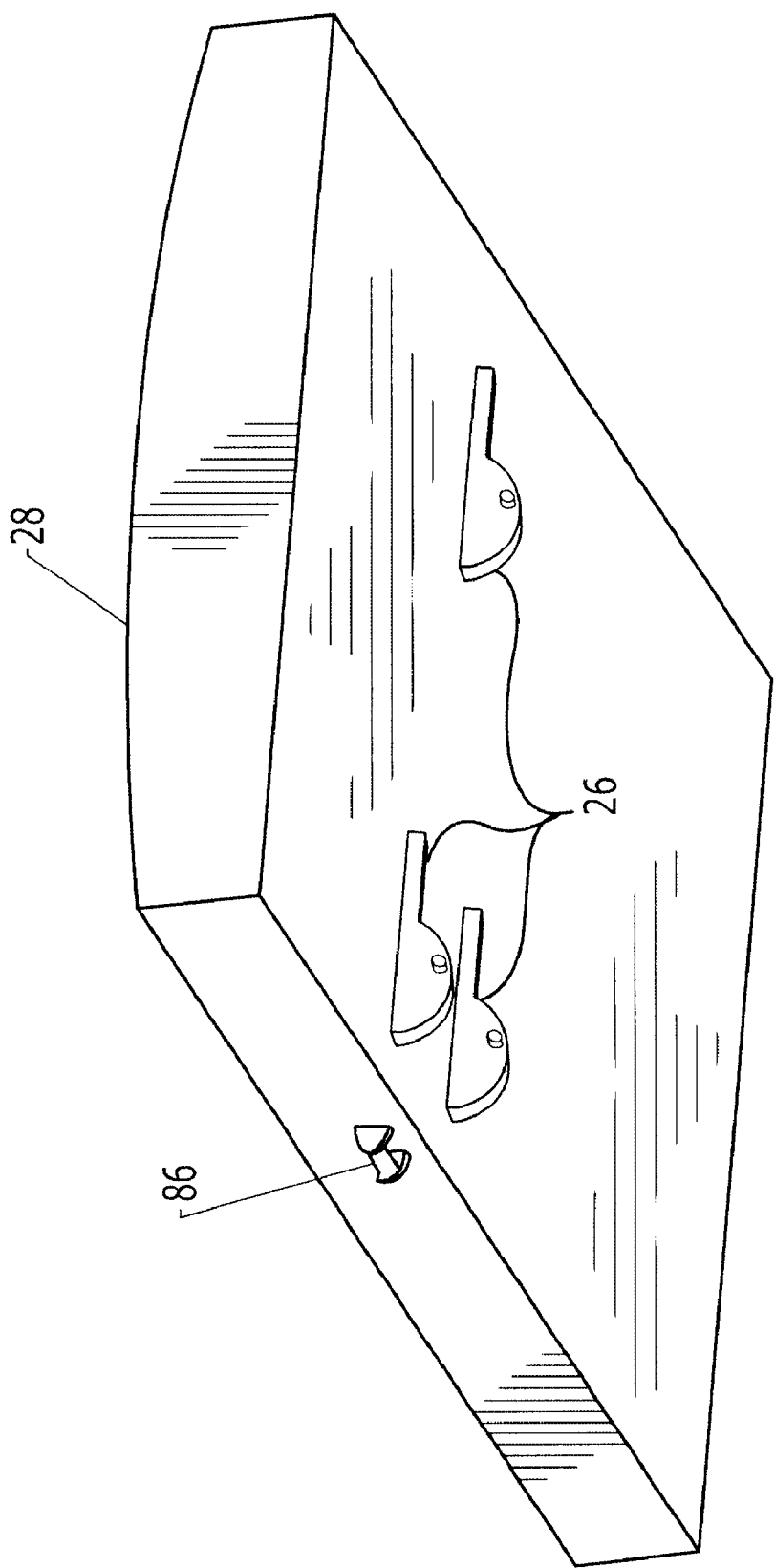
FIG. 8, which is illustrative of prior art, is a schematic, generally bottom pictorial view of the wing structure after the strut fittings are bolted thereto, in accordance with the first embodiment of the present invention.

At step 240, the frame 34 is removed from the workpiece 22 by unmating (e.g., unfastening) the upper and lower fastener portions 78, 46 from one another and thereafter operating the air bearings 42 and the screw jacks 36 accordingly. At step 245, the strut fittings 26 are bolted to the underside of the wing structure 28 in a conventional manner, as should be understood by those of ordinary skill in the art. At step 250, the alignment tool 24 is removed from the wing structure 28 in a conventional manner, as should be understood by those of ordinary skill in the art. Thereafter, the combination of the strut fittings 26 and the wing structure 28 are as schematically illustrated in FIG. 8.

Figure 9:
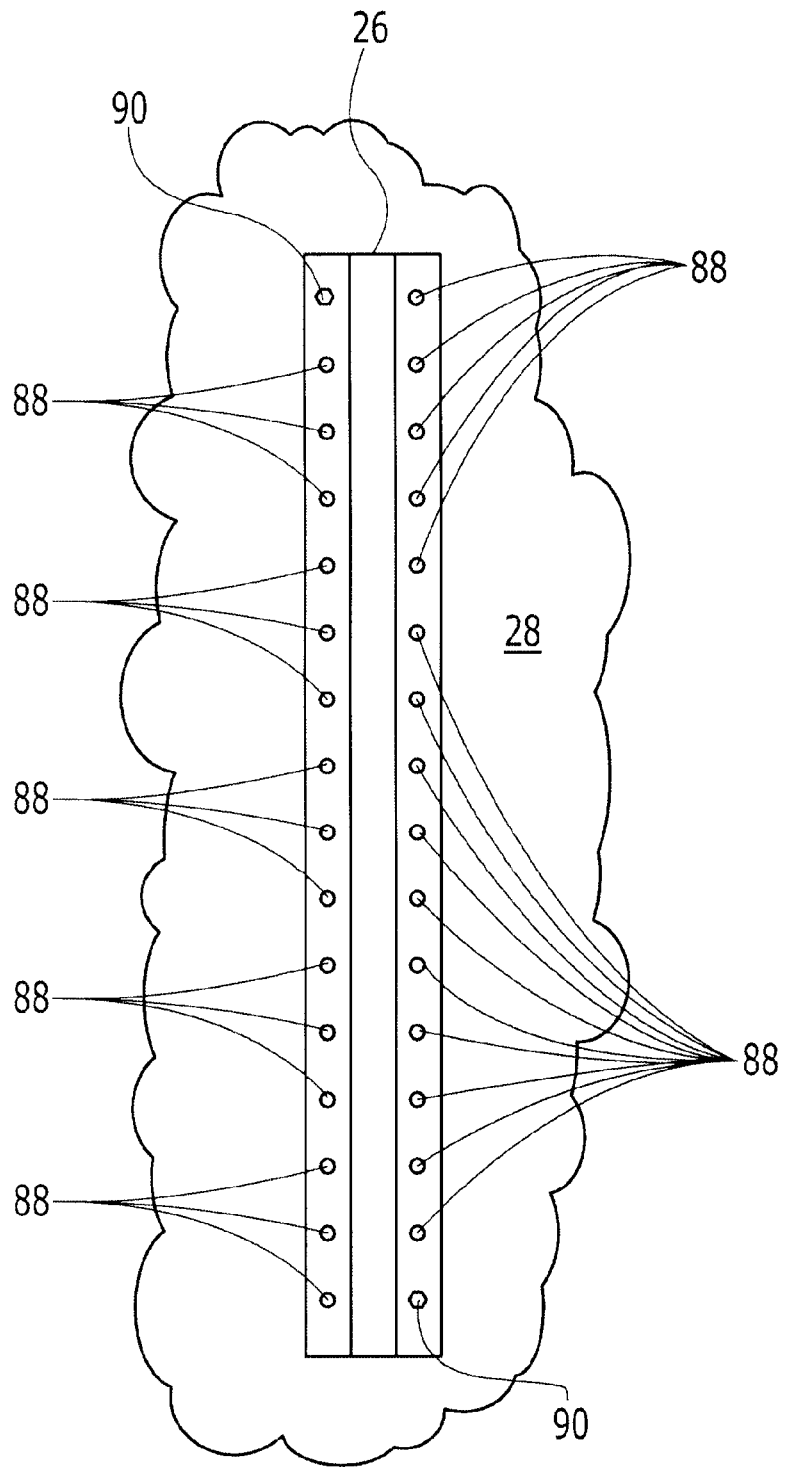
FIG. 9, which is illustrative of prior art, is a schematic, bottom plan view of a strut fitting partially bolted to the underside of a portion of a wing structure.

FIG. 9 is a schematic, bottom plan view of a strut fitting 26 partially secured to the underside of the wing structure 28 by two bolts 90 that extend through their respective attachment holes 88. FIG. 9 further illustrates multiple unoccupied attachment holes 88 that receive respective bolts 90 in the attaching of the strut fitting 26 to the wing structure 28. In accordance with the first embodiment, the attachment holes 88 extend through their respective strutting fitting 26 and into the overlying wing structure 28. The arrangement of the attachment holes 88 illustrated in FIG. 9 is illustrative of a portion of a predetermined pattern of operations performed by the manufacturing machine 20 in accordance with the first embodiment; however, other predetermined patterns are also within the scope of the present invention.

FIG. 10 presents a flow chart illustrating operations performed by the manufacturing machine 20 to form the attachment holes 88, in accordance with the first embodiment. At step 310, instructions are received to manufacture the attachment holes 88. At step 312, the clamp 60 receives the touch probe. At step 315, the touch probe is moved by the manufacturing machine 20 so that the touch probe becomes proximate to and senses the artifacts 76 carried by the underside of the alignment tool 24. A variety of different types of artifacts are within the scope of the present invention, and suitable artifacts can even be other portions of the workpiece 22, including conventional portions of the workpiece.

At step 320, a predetermined pattern of operations that are to be performed to manufacture the attachment holes 88 is adjusted to compensate for the current position of the workpiece 22 with respect to the frame 34. The current position of the workpiece 22 relative to the frame 34 is determined based upon the positions of the artifacts 76 that were determined at step 315. Given the position of the workpiece 22 relative to the frame 34, those of ordinary skill in the art will know how to adjust the predetermined pattern of operations to be performed by the manufacturing machine 20 to compensate for the position of the workpiece with respect to the frame. More specifically, the control system 30 is operated to/operational to perform the necessary data transformation to adjust the predetermined pattern of operations to be performed by the manufacturing machine 20 to compensate for the position of the workpiece 22 with respect to the frame 34.

At step 325, the clamp 60 releases the touch probe. If desired, between steps 325 and 330 the spot facing tool is used to prepare for drilling operations. More specifically, the clamp 60 receives the spot facing tool, the spot facing tool is moved by the manufacturing machine 20 for spot facing purposes, and thereafter the spot facing tool is released by the clamp. At step 330, the clamp 60 receives the drill bit. The drill bit is moved by the manufacturing machine 20 at step 335 to form multiple attachment holes 88. At step 340, the clamp 60 releases the drill bit. At step 345, the clamp 60 receives the reamer. The reamer is moved by the manufacturing machine 20 at step 350 to further form the multiple attachment holes 88 that were partially formed at step 335. At step 355, the clamp 60 releases the reamer.

The spindle 58a receives the tools, for example the touch probe at step 312, the spot facing tool, the drill bit at step 330, and the reamer at step 345, by automatically grasping the tools with the clamp 60 and removing the tools from the respective tool holder station (for example see the tool holder stations 66 in FIG. 13) that is mounted to the upper portion of the frame 34. Likewise, the tools, for example the touch probe at step 325, the spot facing tool, the drill bit at step 340, and the reamer at step 355, are automatically returned to the tool holder station after being used. More specifically and in accordance with the first embodiment, the spindle 58a is equipped with a conventional power draw bar (not shown) for automatic tool changing, as should be understood by those of ordinary skill in the art.

FIG. 11 illustrates operations performed by the manufacturing machine 20 during the forming of each of the multiple attachment holes 88 at step 335 (FIG. 10). At step 410, the spindle 58a is rotated at a first speed while moving along its axis 62 to drill through the strut fitting 26, and immediately thereafter the spindle is rotated at a second speed while moving along its axis 62 to drill through the wing structure 28 at step 420. The second speed is substantially greater than the first speed. The automatic varying of the rotational speed of the spindle 58 a that is illustrated by steps 410 and 420 is advantageous because, in accordance with the first embodiment, the strut fittings 26 are constructed of a relatively hard material, such as titanium, whereas the wing structure 28 is constructed of a relatively soft material, such as aluminum. More specifically and in accordance with the first embodiment, the first and second speeds are respectively approximately 100–500 rpm and 1000–6000 rpm. The automatic varying of the drilling speed advantageously optimizes the drilling of the attachment holes 88.

As mentioned above, the second embodiment of the present invention is identical to the first embodiment of the present invention, except for variations noted herein and variations that will be apparent to those of ordinary skill in the art. Relevant to the second embodiment is the fact that different types of aircraft engines have different alignment tools (for example see the alignment tool 24 in FIGS. 1, 4 and 6–7). In accordance with the second embodiment, each of the different alignment tools have designed thereinto alignment tooling features (such as, but not limited to, an alignment connector 80 and artifact structures 76) so that the manufacturing machine of the second embodiment can perform the operations of the present invention while being used with the different alignment tools. More specifically, the frame (not shown) of the manufacturing machine (not shown) of the second embodiment is like the frame 34 of the manufacturing machine 20 of the first embodiment, except, for example, that its lower fastener portions (for example see the lower fastener portions 46), or some other fastening means for mounting the frame to the different alignment tools, are movably mounted or otherwise movable to facilitate attachment of the frame to the different alignment tools. Accordingly, in accordance with the second embodiment the aligning of the frame to the workpiece at step 225 of FIG. 5 can be more involved than it is in the first embodiment.

Figure 12:
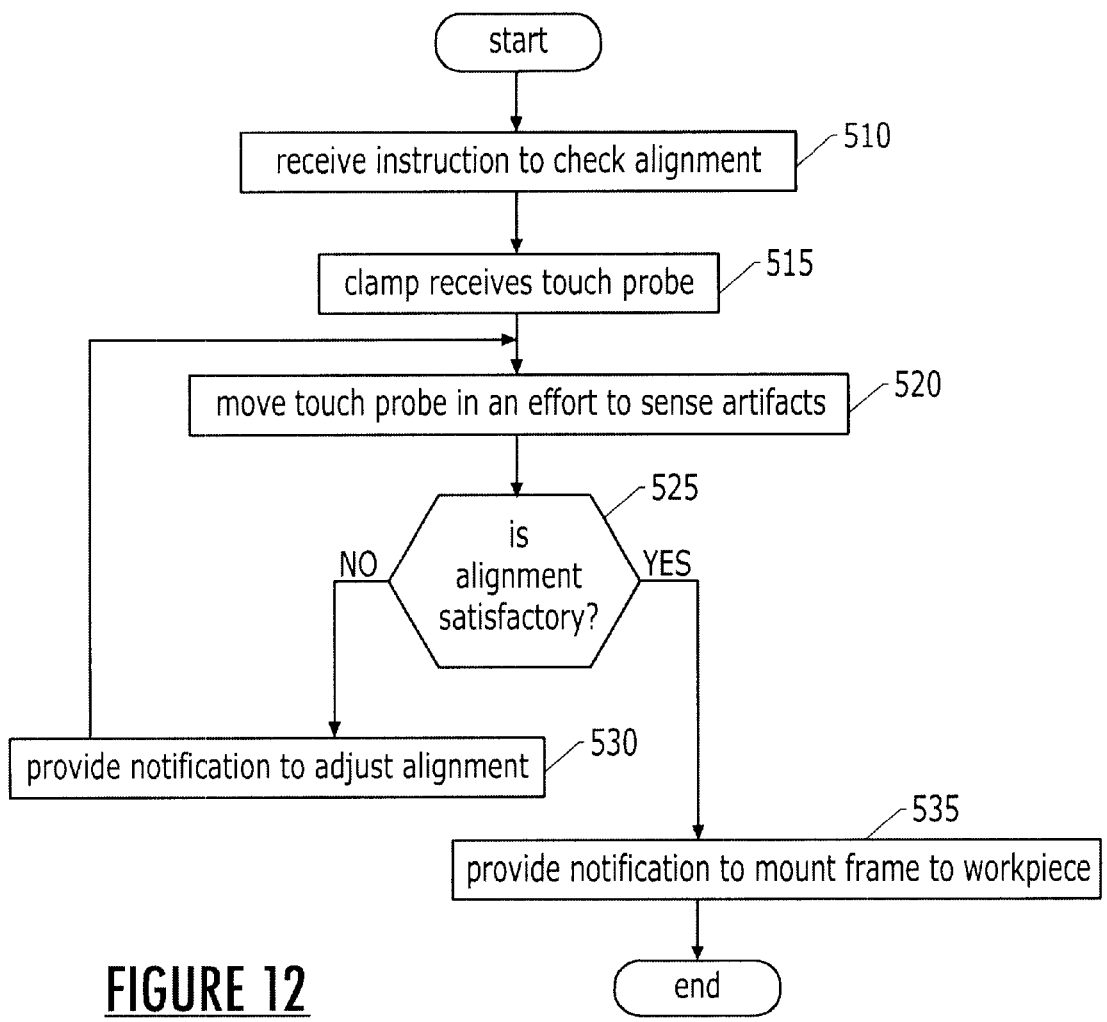
FIG. 12 presents a flow chart illustrating alignment operations performed by the manufacturing machine of FIG. 1 preparatory to forming the attachment holes, in accordance with a second embodiment of the present invention.

FIG. 12 presents a flow chart illustrating alignment operations performed by the manufacturing machine preparatory to forming the attachment holes 88, in accordance with the second embodiment. In accordance with the second embodiment, the manual adjustment of the alignment of the frame to the workpiece at step 225 (FIG. 5) is iteratively carried out based on outputs received from the manufacturing machine. The flow chart presented by FIG. 12 illustrates operations performed by the manufacturing machine in the furtherance of providing the outputs that aid in the alignment of the frame with the workpiece at step 225, in accordance with the second embodiment. The operations illustrated by FIG. 12 will now be described, in accordance with the second embodiment.

Referring to FIG. 12, the manufacturing machine receives instructions to check the alignment of the frame to the workpiece at step 510. At step 515, the clamp (for example see the clamp 60) receives the touch probe. At step 520, the manufacturing machine operates to move the touch probe in an effort to sense the artifacts of the workpiece (for example see the artifacts 76). At step 525, a determination is made as to whether the alignment of the frame to the workpiece is satisfactory. The alignment is satisfactory if the manufacturing machine would be able to sufficiently accurately form the desired attachment holes 88. If the alignment of the frame to the workpiece is determined not to be satisfactory at step 525, control is transferred to step 530, where a notification is provided to further manually adjust the alignment of the frame to the workpiece. Suitable manual adjustments are like those performed at step 225 (FIG. 5). If the alignment of the frame to the workpiece is determined to be satisfactory at step 525, control is transferred to step 535, where a notification is provided to mount the frame to the workpiece. In accordance with one example of the second embodiment, the frame is sufficiently aligned to the workpiece at step 525 if each of the artifacts are found to be sufficiently close to respective predetermined positions, such that each of the artifacts is no farther than approximately 0.010 inches to 0.030 inches from its respective predetermined position. The aligning of the frame with the workpiece can be further automated by incorporating a machine vision system into the present invention. In accordance with an alternative embodiment of the present invention, steps 525, 530 and 535 are performed manually, rather than by the manufacturing machine.

In accordance with the second embodiment, it is not necessary for the clamp to receive the touch probe at step 312 (FIG. 10), because in accordance with the second embodiment the operations illustrated in FIG. 12 do not include releasing the touch probe from the clamp. However, in accordance with an alternative embodiment of the present invention, additional receiving and releasing operations are carried out by the clamp.

In accordance with the illustrated versions of the first and second embodiments, the pitch load fitting 86 on the front spar of the wing structure 28 provides a frame of reference, and the positions of the artifacts 76 relative to the pitch load fitting are known while the workpiece 22 is assembled. Accordingly, steps 520 (FIG. 12) and 315 (FIG. 10) can be characterized as performing operations to index off of the pitch load fitting 86.

In accordance with the first embodiment, the computer control system 30 (FIG. 1) includes one or more data storage devices, a processor, a computer numerical control, one or more input devices, and one or more output devices. In accordance with the first embodiment, all axes of motion of the manufacturing machine, some of which are represented by the arrows 52, 56*a*, 56*b*, 64, are controlled by the computer system 30. In this regard and as one example, the computer system 30 can acceptably be driven by a digital data set derived from CATIA, or the like.

Regarding the computer system 30 more specifically, the data storage device(s) include computer-readable storage medium and can acceptably be in the form of hard disks and drives therefor, floppy disks and drives therefor, CD ROMs and drives therefor, digital video disks and drives therefor, memory cards, or any other type of computer-readable storage medium. The processor is preferably a conventional computer processor. The input device(s) preferably include one or more conventional components such as, but not limited to, a keyboard, a mouse, a virtual track ball, a light pen, voice recognition equipment, or the like. The output device(s) preferably include one or more conventional components such as, but not limited to, a display that presents images on a screen, and a printer, or the like. Servo drives and servo feedback positioning devices are connected to and cooperate with the computer numerical control in a manner that should be understood by those of ordinary skill in the art.

A conventional software module operates in conjunction with the computer system 30 so that the computer system provides instructions to the manufacturing machine that result in the manufacturing machine performing its manufacturing tasks. The software module provides a graphical user interface via the display, and the graphical user interface includes multiple display screens that are presented to a user of the computer system via the display. The display screens display information that a user has input or selected, and information that the software module outputs. A user may input information via the input device(s).

In accordance with the first embodiment, the computer system 30 includes a computer program product. The computer program product includes a computer-readable storage medium having computer-readable program code means or devices, such as a series of computer instructions, embodied in the computer-readable storage medium for facilitating the operations of the present invention.

In this regard, FIGS. 10–12 are block diagram, flowchart and control flow illustrations of methods, systems and program products according to the invention. It will be understood that each block or step of the block diagram, flowchart and control flow illustrations, and combinations of blocks in the block diagram, flowchart and control flow illustrations, can be implemented by computer program instructions. These computer program instructions may be loaded onto a computer or other programmable apparatus to produce a machine, such that the instructions which execute on the computer or other programmable apparatus create means or devices for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means or devices which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram, flowchart or control flow illustrations support combinations of means or devices for performing the specified functions, combinations of steps for performing the specified functions and program instruction means or devices for performing the specified functions. It will also be understood that each block or step of the block diagram, flowchart or control flow illustrations, and combinations of blocks or steps in the block diagram, flowchart or control flow illustrations, can be implemented by special purpose hardware-based computer systems which perform the specified functions or steps, or combinations of special purpose hardware and computer instructions.

Figure 15:
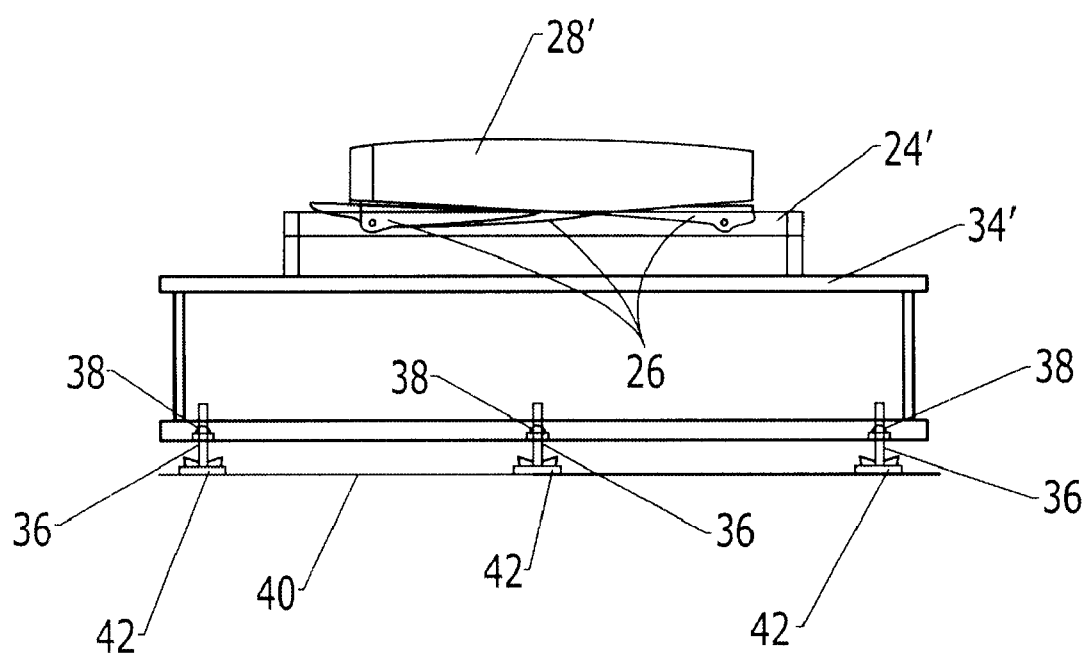
FIG. 15 is a partial, schematic, environmental, side elevation view of the manufacturing machine of FIG. 13, in accordance with the third embodiment of the present invention.
Figure 16:
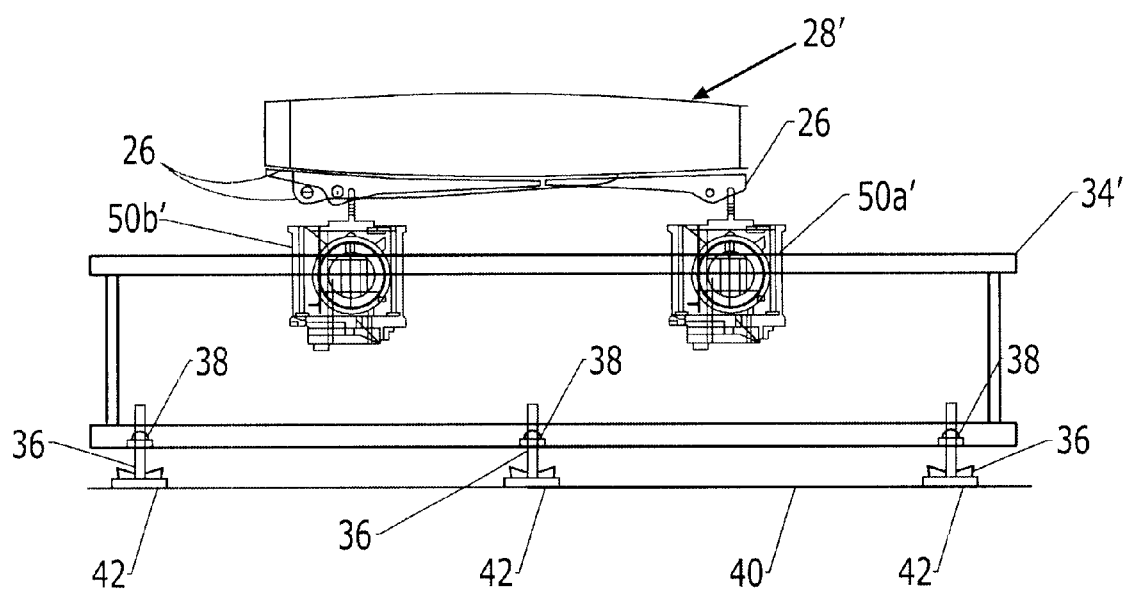
FIG. 16 is a partial, schematic, environmental, side elevation view of the manufacturing machine of FIG. 13, in accordance with the third embodiment of the present invention.
Figure 17:
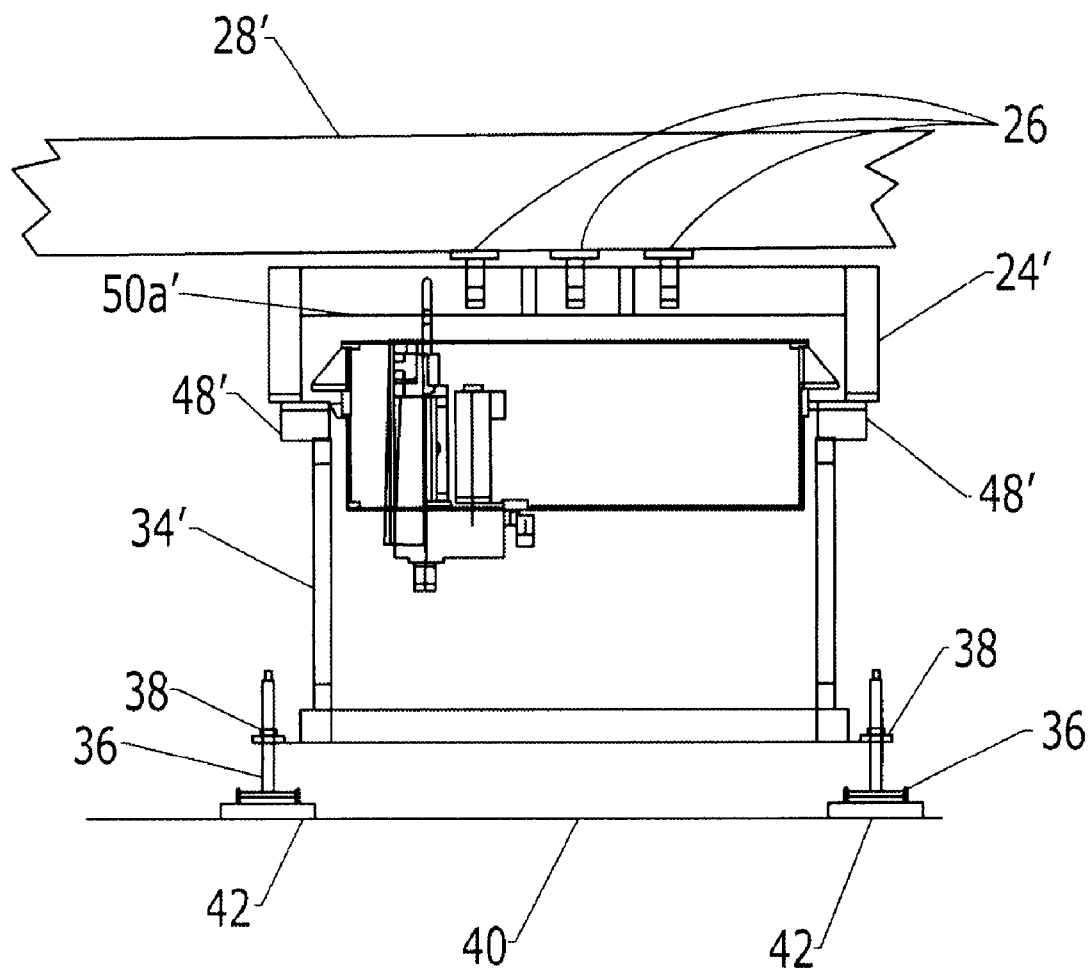
FIG. 17 is a partial, schematic, environmental, end elevation view of the manufacturing machine of FIG. 13, in accordance with the third embodiment of the present invention.

The third embodiment of the present invention is identical to the second embodiment of the present invention, except for variations noted herein and variations that will be apparent to those of ordinary skill in the art. FIGS. 13–14 are partial, schematic, environmental, top plan views of a portable manufacturing machine, in accordance with the third embodiment of the present invention. FIGS. 15–16 are partial, schematic, environmental, side elevation views of the manufacturing machine, in accordance with the third embodiment. FIG. 17 is a partial, schematic, environmental, end elevation view of the manufacturing machine, in accordance with the third embodiment.

The manufacturing machines of the present invention can be used on new airplanes or for retrofitting older aircraft with new strut fittings. Whereas the present invention is primarily described herein with respect to vertical wing drilling, horizontal wing drilling and other manufacturing operations are also within the scope of the present invention.

It should be apparent from the foregoing that the present invention can provide numerous advantages, examples of which are summarized below. In accordance with one aspect, manufacturing machines of the present invention can be efficiently utilized to manufacture attachment holes for use in attaching strut fittings to a variety of different wing structures and for a wide variety of different engines. In accordance with one aspect, appropriate portions of the manufacturing machines of the present invention can be conveniently moved into place with respect to workpieces to be machined, and the manufacturing machines can automatically orient themselves with respect to the workpieces and automatically perform manufacturing operations. In accordance with one aspect, appropriate portions of the manufacturing machines of the present invention can be made relatively light-weight if desired, because the manufacturing machines can be mounted to the workpieces in a manner that increases the rigidity of the manufacturing machines. The scope of the present invention is not to be limited by the recitation of selected advantages. In addition, other advantages provided by the present invention will be understood by those of ordinary skill in the art.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of manufacturing attachment holes for use in attaching strut fittings to a wing structure, comprising:

assembling a workpiece, comprising removably mounting an alignment tool to a wing structure so that the alignment tool holds the strut fittings to the wing structure;

moving at least a frame of a computer numeric controlled manufacturing machine from a first position that is distant from the workpiece to a second position that is proximate the workpiece;

removably mounting the frame to the workpiece;

quantifying an orientation of the workpiece with respect to the frame;

adjusting a predetermined pattern of operations to be performed by the manufacturing machine on the workpiece to compensate for the orientation of the workpiece relative to the frame; and operating the manufacturing machine to perform the predetermined pattern of operations on the workpiece, comprising forming attachment holes in the strut fittings and the wing structure.

2. A method according to claim 1, wherein operating the manufacturing machine to perform the predetermined pattern of operations on the workpiece comprises:

moving a first carriage that is carried the frame back and forth in a first direction relative to the frame;

moving a second carriage that is mounted to the first carriage back and forth in a second direction that is orthogonal to the first direction; and operating a spindle that is carried by the second carriage and thereby moves with the second carriage.

3. A method according to claim 1, wherein moving at least the frame of the computer numeric controlled manufacturing machine from the first position that is distant from the workpiece to the second position that is proximate the workpiece comprises:

moving the frame across a floor; and elevating the frame above the floor.

4. A method according to claim 1, wherein mounting the frame to the workpiece comprises increasing rigidity of the frame by securing the frame to the workpiece.

5. A method according to claim 1, wherein operating the manufacturing machine to perform the predetermined pattern of operations on the workpiece comprises drilling a hole that extends through both one of the strut fittings and the wing structure, and the drilling comprises:

rotating a spindle at a first speed while drilling through the strut fitting, and rotating the spindle at a second speed that is substantially greater than the first speed while drilling through the wing structure, wherein the drilling through the wing structure follows immediately after the drilling through the strut fitting.

6. A method according to claim 1, wherein moving at least the frame of the computer numeric controlled manufacturing machine from the first position that is distant from the workpiece to the second position that is proximate the workpiece comprises positioning the frame below the workpiece so that after the mounting and during the operating the frame is positioned below the workpiece.

7. A method according to claim 6, wherein mounting the frame to the workpiece comprises causing the workpiece to at least partially bear weight of the frame.

8. A method of machining a workpiece, comprising:

moving at least a frame of a computer numeric controlled manufacturing machine from a first position that is distant from a workpiece to a second position that is proximate the workpiece;

removably mounting the frame to the workpiece;

quantifying an orientation of the workpiece with respect to the frame;

adjusting a predetermined pattern of operations to be performed by the manufacturing machine on the workpiece to compensate for the orientation of the workpiece relative to the frame; and operating the manufacturing machine to perform the predetermined pattern of operations on the workpiece.

9. A method according to claim 8, wherein operating the manufacturing machine to perform the predetermined pattern of operations on the workpiece comprises:

moving a first carriage that is carried by the frame back and forth in a first direction relative to the frame, moving a second carriage that is mounted to the first carriage back and forth in a second direction that is orthogonal to the first direction, and operating a spindle that is carried by the second carriage and thereby moves with the second carriage.

10. A method according to claim 8, wherein moving at least the frame of the computer numeric controlled manufacturing machine from the first position that is distant to the workpiece to the second position that is proximate the workpiece comprises:

moving the frame across a floor; and elevating the frame above the floor.

11. A method according to claim 8, wherein mounting the frame to the workpiece comprises increasing rigidity of the frame by securing the frame to the workpiece.

12. A method according to claim 8, wherein moving at least the frame of the computer numeric controlled manufacturing machine from the first position that is distant from the workpiece to the second position that is proximate the workpiece comprises positioning the frame below the workpiece so that after the mounting the frame is positioned below the workpiece.

13. A method according to claim 12, wherein mounting the frame to the workpiece comprises causing the workpiece to at least partially bear weight of the frame.

* * * * *